J. F. HORNE.
SUPPORT FOR MILKING PAILS.
APPLICATION FILED FEB. 25, 1914.

1,124,441.

Patented Jan. 12, 1915.

Witnesses:

Inventor:
John F. Horne

UNITED STATES PATENT OFFICE.

JOHN F. HORNE, OF PORTLAND, MAINE.

SUPPORT FOR MILKING-PAILS.

1,124,441.           Specification of Letters Patent.      Patented Jan. 12, 1915.

Application filed February 25, 1914. Serial No. 821,102.

*To all whom it may concern:*

Be it known that I, JOHN F. HORNE, of Portland, in the county of Cumberland and State of Maine, have invented certain new and useful Improvements in Supports for Milking-Pails, of which the following is a specification.

My invention relates to a support to be applied to milking pails to enable the latter to be held in a proper position between the legs.

Hitherto, such supports or leg rests have been secured to the upper portion of the pail generally to the rim and ears. It has been difficult to get a leg rest which could be readily attached to the upper rim and ears of any of the pails commonly used for milking to hold the pail firmly on account of the variation in the thickness of the rims and the fact that the devices must of necessity be simple and cheaply made with few parts and little means for adjustment.

I overcome this difficulty by means of the pail support hereinafter described and claimed.

My invention may best be understood by means of the accompanying drawing, in which several forms of my invention are shown.

Figure 1:
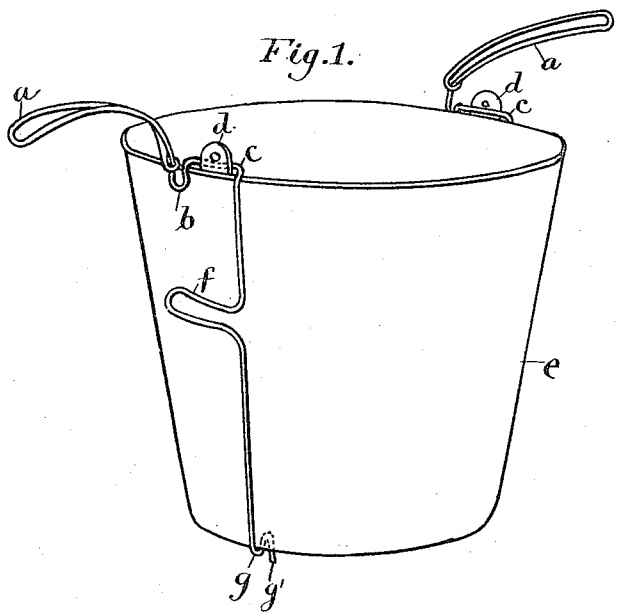
Figure 2:
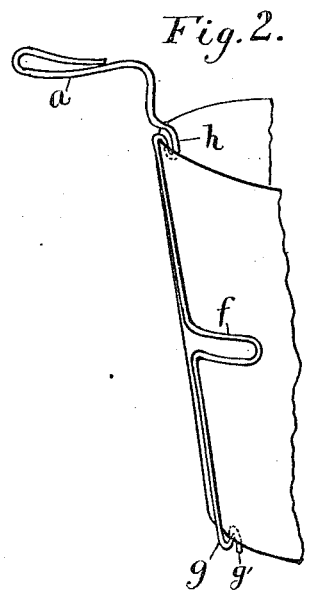
Figure 3:
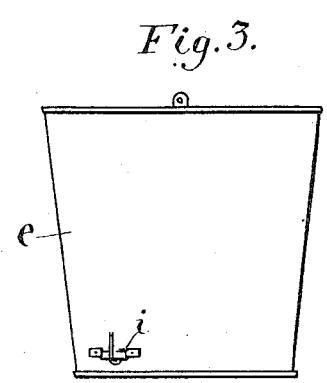

In the drawing, Figure 1 is a perspective view of a milking pail provided with my pail supports in their preferable form, Fig. 2 is a perspective view of a portion of a pail with a modified form applied, and Fig. 3 is an elevation of a pail showing an alternate means of securing the lower end.

Similar letters indicate similar parts.

Considering Fig. 1, the support is made up of a clamping portion, the lower end of which is adapted to be hooked under the lower rim, the upper end being formed into a loop which embraces one of the ears, a hook which engages the rim and terminating in a leg rest above and extending out from the upper end of the clamping portion.

As herein shown, the support is made of a piece of wire, one end of which is bent outwardly and doubled back to form a leg rest $a$, the balance of the wire constituting a clamping portion. At the base of the leg rest the wire is bent down and back to form a vertical loop $b$ which is bent into a hook to engage the thickened rim of the pail.

Extending inwardly from the loop $b$ is a horizontally elongated loop $c$ which extends around and embraces the ear $d$ of the pail $e$.

From the end of the loop $c$ the wire extends downwardly to the bottom of the pail, where it is formed into a loop $g$ which is adapted to hook over the chime or lower edge. A spring loop $f$ is formed at some suitable point for temporarily extending the lower end of the wire with its hook for engaging the lower rim of the pail and this hook takes a portion of the weight of the pail.

The end of the wire $g'$ is turned downward after forming the hook $g$, to constitute a bearing for the pail to rest on to keep the rim from the floor.

It will be seen that the loop $c$ and the hook $b$ engaging the ear and the upper rim of the pail hold the upper part of the device in position and the hook $g$ sustains the principal portion of the weight.

In applying the device the loop and the hook $b$ are first placed in position and then the hook $g$ is snapped into place under the lower rim of the pail, the spring loop $f$ being stretched for this purpose and acting to hold the upper and lower hooks in engagement with the upper and lower edges of the pail.

The loop $c$ is preferably made of greater length horizontally than the width of the ear so that the support may slide forward and back for a limited distance and so regulate the angle at which the pail will hang suspended from the leg rests as it is obvious that the more the latter are offset from the ears the greater will be the natural inclination of the pail.

The device shown in Fig. 1 can be used on any form of milk pail whether the same is provided with a cover or not, since no part of it projects down on the inside of the pail below the upper rim.

In Fig. 2 I show a form of my device which is not dependent upon the ear of the pail for any part of its support and which is more especially adapted to be used on uncovered pails.

In Fig. 2 the lower part of the clamping portion is the same as that shown in Fig. 1 but the portion which engages the upper edge of the pail consists of a hook $h$ formed by doubling the wire into a loop and bending it down so that it may be hooked over the upper edge and extend down on the inside of the pail. Instead of engaging the lower hook with the lower edge of the pail it may be made to engage a special bracket as shown in Fig. 3, where $i$ is a special bracket secured to the side of the pail near the bottom.

A pail support made according to my invention may be quickly applied to the pail, it supports the pail in an inclined position, it may be used with either a covered or an uncovered pail and there is plenty of material in the clamping portion to provide for the stretching or extension of the clamp to fit pails of different lengths.

I claim:—

1. A support for milking pails formed of a piece of wire bent at one end to hook over the lower rim of the pail and at the other end to form a leg rest and a loop for embracing the pail ear, the end of said loop and the base of said leg rest being connected by a downwardly extending hook for engaging the upper rim of the pail.

2. A support for milking pails formed of a piece of wire bent at one end to hook over the lower rim of the pail and at the other end to form a leg rest and a horizontally elongated loop for embracing the pail ear, the end of said loop and the base of said leg rest being connected by a downwardly extending hook for engaging the upper rim of the pail.

3. A support for milking pails formed of a single piece of wire bent at one end to form a leg rest and engaging means for securing it to the upper rim of the pail and having its opposite end formed into a hook for engaging the lower rim of the pail, a yielding loop being formed between the ends to allow a limited vertical elongation.

4. A support for milking pails including a clamping portion composed of a single piece of wire formed to engage the upper and lower portions of the pail and having a yielding portion between the ends to permit of a limited longitudinal extension.

5. A support for milking pails consisting of a piece of wire, one end of which is bent to form a leg rest and means for engaging the upper rim of the pail and the opposite end being bent to form a hook to engage the lower rim of the pail, the extremity of the hook being turned downward to form a rest to keep the pail from contact with the floor.

6. A support for milking pails consisting of a single piece of wire bent to form upper and lower hooked members to engage the top and bottom of the pail and an intermediate spring portion to draw said hooked members together.

In testimony whereof I have affixed my signature, in presence of two witnesses.

JOHN F. HORNE.

Witnesses:
CORNELIUS SCHUYLER DAVIS,
DAISY GURNEE.

Copies of this patent may be obtained for five cents each, by addressing the "Commissioner of Patents, Washington, D. C."